(12) United States Patent
Pang (10) Patent No.: US 9,100,380 B2
(45) Date of Patent: Aug. 4, 2015

(54) FILE DOWNLOAD METHOD, DEVICE AND SYSTEM

(71) Applicant: TENCENT TECHNOLOGY (SHENZHEN) COMPANY LIMITED, Shenzhen, Guangdong (CN)

(72) Inventor: Yongqiang Pang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 88 days.

(21) Appl. No.: 14/122,001

(22) PCT Filed: Nov. 20, 2012

(86) PCT No.: PCT/CN2012/084922
§ 371 (c)(1),
(2) Date: Nov. 25, 2013

(87) PCT Pub. No.: WO2013/107212
PCT Pub. Date: Jul. 25, 2013

(65) Prior Publication Data
US 2014/0129675 A1 May 8, 2014

(30) Foreign Application Priority Data
Jan. 19, 2012 (CN) .......................... 2012 1 0017755

(51) Int. Cl.
G06F 15/16 (2006.01)
H04L 29/08 (2006.01)
H04L 29/06 (2006.01)
H04L 29/12 (2006.01)

(52) U.S. Cl.
CPC ............. *H04L 67/06* (2013.01); *H04L 29/06* (2013.01); *H04L 29/08072* (2013.01); *H04L 61/1582* (2013.01); *H04L 67/1063* (2013.01); *H04L 67/1078* (2013.01)

(58) Field of Classification Search
CPC ......................... H04L 29/06; H04L 29/08072
USPC .................... 709/206, 220, 224, 227; 726/22
See application file for complete search history.

(56) References Cited

U.S. PATENT DOCUMENTS

| | | | |
|---|---|---|---|
| 8,484,730 B1* | 7/2013 | P. R. ............................... | 726/22 |
| 2008/0178234 A1* | 7/2008 | Eyal et al. ....................... | 725/91 |
| 2013/0132523 A1* | 5/2013 | Love et al. ..................... | 709/219 |
| 2014/0280859 A1* | 9/2014 | Liu et al. ....................... | 709/223 |

FOREIGN PATENT DOCUMENTS

| CN | 101719936 | 6/2010 |
|---|---|---|
| CN | 101917488 | 12/2010 |
| CN | 101924797 | 12/2010 |

OTHER PUBLICATIONS

International Search Report for PCT/CN2012/084922, mailed Mar. 7, 2013.

* cited by examiner

*Primary Examiner* — Khanh Dinh
(74) *Attorney, Agent, or Firm* — Nixon & Vanderhye P.C.

(57) ABSTRACT

Disclosed are a file download method, device and system. The file download method comprises: obtaining a file identifier of a target file from a first server in accordance with a source download link of the target file; obtaining download mode information about the target file from a second server in accordance with the file identifier of the target file; and downloading the target file in accordance with the download mode information about the target file. The present invention can save maintenance costs and investments for a storage platform.

7 Claims, 5 Drawing Sheets

FILE DOWNLOAD METHOD, DEVICE AND SYSTEM

CROSS-REFERENCES TO RELATED APPLICATIONS

This application is a United States national phase application of co-pending international patent application number PCT/CN2012/084922, filed Nov. 20, 2012, which claims priority to Chinese patent application number 201210017755.3, filed Jan. 19, 2012, the disclosures of which are incorporated herein by reference.

FIELD OF THE INVENTION

The present invention relates to communication technologies, and in particular to a file download method, device and system.

BACKGROUND OF THE INVENTION

The Peer-to-Peer (P2P) technology is a new network technology. In downloading a file, the speed of downloading the file is dependent on the computing abilities and bandwidths of participators in the network, instead of only a few servers.

A file to be downloaded may be downloaded to a P2P client by clicking a download link. However, the link might be broken during the process of downloading the file. The broken link means an invalid download link. In the case of the broken link, the P2P client cannot finish downloading the file.

In order to avoid the case that the file cannot be downloaded due to the broken link, the file for downloading is stored in the cloud for a backup purpose during the downloading of the file, and the download link corresponding to the file is also stored in the cloud. Then, a new link is generated for the backuped file stored in the cloud, and the new link is mapped to the download link aforementioned. In the case that the download link is broken, the new link aforementioned can still be found via the download link and used for downloading the backuped file in the cloud.

However, lots of the backuped files need to be stored in the cloud during the above downloading processes, thus the storage capacity of the cloud shall be large enough, and large bandwidth is required by the cloud to provide the backuped files. Therefore, maintenance and investment costs for the cloud are expensive.

SUMMARY OF THE INVENTION

Technical Problem

The embodiments of the invention provide a file download method, device and system, so as to save costs.

Technical Solution

The embodiments of the invention adopt the following technical solutions.

A file download method, includes:
obtaining a file identifier of a target file from a first server in accordance with a source download link of the target file;
obtaining download mode information about the target file from a second server in accordance with the file identifier of the target file; and
downloading the target file in accordance with the download mode information about the target file;
where, obtaining a file identifier of a target file from a first server in accordance with a source download link of the target file, includes:
sending the source download link of the target file to the first server, so that the first server looks up a stored corresponding relationship between the download link and the file identifier in accordance with the source download link of the target file to obtain the file identifier of the target file; and
receiving the file identifier of the target file from the first server;
where, the file identifier is the Hash value of the target file.

A file download method, includes:
obtaining a file identifier of a target file from a first server in accordance with a source download link of the target file;
obtaining download mode information about the target file from a second server in accordance with the file identifier of the target file; and
downloading the target file in accordance with the download mode information about the target file.

A file download device, including:
a first obtaining unit, which is used for obtaining a file identifier of a target file from a first server in accordance with a source download link of the target file;
a second obtaining unit, which is used for obtaining download mode information about the target file from a second server in accordance with the file identifier of the target file; and
a file download unit, which is used for downloading the target file in accordance with the download mode information about the target file.

A file download system, including:
a P2P client, which includes a file download device used for: sending a source download link of a target file to a first server, and obtaining a file identifier of the target file from the first server; sending the file identifier of the target file to a second server, and obtaining download mode information about the target file from the second server; and downloading the target file in accordance with the download mode information about the target file.
the first server, which is used for providing the file identifier of the target file for the P2P client; and
the second server, which is used for providing the download mode information about the target file for the P2P client.

Beneficial Effects

With the file download method, device and system disclosed by the embodiments of the invention, the file identifier of the target file can be obtained via the source download link of the target file, then the download mode information about the target file can be obtained on the basis of the file identifier of the target file, and then the target file can be downloaded in accordance with the download mode information. As can be seen from the above, a special storage platform established for storing the copy of the target file and the download link related to the target file in the prior art is not necessary in the embodiments of the invention. Therefore, the maintenance and investment for some storage platform are not needed for the embodiments of the invention. Thus, compared with the prior art, the file download method, device and system disclosed by the embodiments of the invention are advantageous for cost saving.

BRIEF DESCRIPTION OF THE DRAWINGS

In order to clearly explain the technical solutions of the embodiments of the invention, the figures used in the descriptions of the embodiments are briefly introduced as follows. Obviously, the figures in the following descriptions only show some embodiments of the invention, and other figures can also be obtained based on the figures by those skilled in the art without any creative work.

DETAILED DESCRIPTION OF PREFERRED EMBODIMENTS

The technical solutions in the embodiments of the invention are clearly and completely described as follows in combination with the drawings appended to the embodiments of the invention. Obviously, the described embodiments are only a part of the embodiments of the invention instead of all the embodiments. In light of the embodiments of the invention, all other embodiments obtained by those skilled in the art without any creative work fall within the scope of the invention.

Before the specific implementations of the embodiments of the invention are described, the system to which the embodiments of the invention are applied is introduced firstly.

Figure 1:
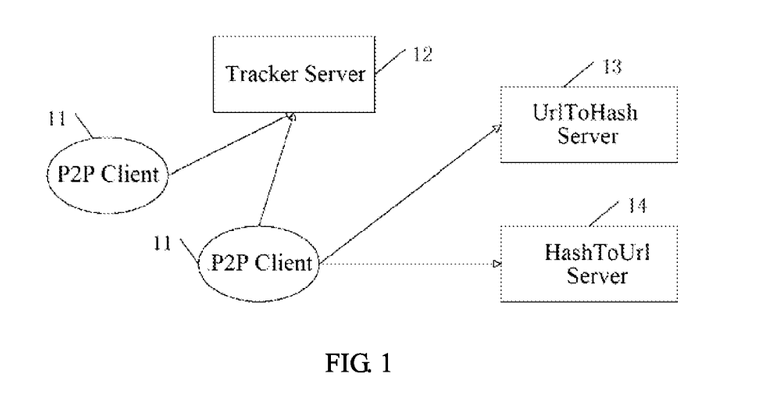
FIG. 1 is a schematic diagram of the file download system according to a first embodiment of the invention.

As shown in FIG. 1 which is a schematic diagram of the file download system disclosed by the first embodiment of the invention, the file download system comprises: a plurality of P2P clients 11, a tracker server 12, a Universal Resource Locator To Hash (UrlToHash) server 13, and a Hash To URL (HashToUrl) server 14. The UrlToHash server 13 may be used as a first server described below; and any one or combination of the tracker server 12 and the HashToUrl server 14 may be used as a second server described below. For example, the tracker server 12 may be used as the second server described below, or, the HashToUrl server 14 may be used as the second server described below, or, the combination of the tracker server 12 and the HashToUrl server 14 may be used as the second server described below.

The P2P client 11 is a client for conducting file download, e.g., a QQ cyclone client. In a specific application, the P2P client includes a file download device described in the following embodiments. The P2P client is used for: sending a source download link of a target file to the first server, and obtaining a file identifier of the target file from the first server; sending the file identifier of the target file to the second server, and obtaining download mode information about the target file from the second server; and downloading the target file in accordance with the download mode information about the target file.

The tracker server 12 is used for storing the information of the online P2P clients and the corresponding relationships of files stored at the P2P clients; and the P2P clients can inquire the corresponding relationships.

The UrlToHash server 13 is used for storing the corresponding relationship between the download link and the file identifier. In the embodiment, the file identifier is the Hash value of the file, which is obtained by performing a Hash algorithm on the file, and the Hash value uniquely corresponds to the file.

The Hash algorithm includes, but is not limited to the algorithms of MD4, MD5, SHA1, SHA2 and the like. The UrlToHash server is a generic term, and includes two servers of eMuleToHash and TorrentToHash in addition to the common Http download protocol. The eMuleToHash server is used for processing a corresponding relationship between the eMule download link and the Hash value of the file; and the TorrentToHash server is used for processing the seed of the Bit-Torrent (BT) protocol and the Hash value corresponding to the file included in the seed.

The HashToUrl server 14, is used for storing the corresponding relationship between the file identifier and the download link.

The specific working principle of each component in the system aforementioned is described in combination with the following embodiments.

As can be seen from the above, a special storage platform established for storing the copy of the target file and the download link related to the target file in the prior art is not necessary in the present embodiment of the invention. Therefore, the maintenance and investment for some storage platform are not needed for the present embodiment of the invention. Thus, compared with the prior art, the file download system disclosed by the present embodiment of the invention is advantageous for cost saving.

Figure 2:
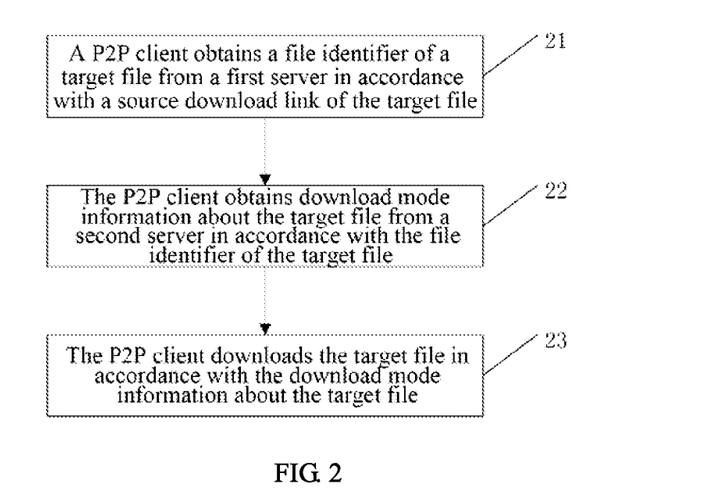
FIG. 2 is a flow chart of the file download method according to a second embodiment of the invention.

As shown in FIG. 2, the file download method disclosed by the second embodiment of the invention includes Steps 21-23 below.

At Step 21, A P2P client obtains a file identifier of a target file from a first server in accordance with a source download link of the target file.

Here, the source download link means a broken download link, namely, the embodiment of the invention is applicable to the case that the source download link is a broken link. As mentioned above, the first server may be a UrlToHash server. At Step 21, the P2P client sends the source download link of the target file to the first server, in this case, the first server looks up the stored corresponding relationship between the download link and the file identifier in accordance with the source download link of the target file, obtains the file identifier of the target file, and sends the file identifier of the target file to the P2P client. Here, the file identifier may be the Hash value of the target file.

At Step 22, the P2P client obtains download mode information about the target file from a second server in accordance with the file identifier of the target file.

In the embodiment of the invention, as mentioned above, the second server may be a tracker server or a HashToUrl server, or includes both the tracker server and the HashToUrl server. Correspondingly, when the second server is the HashToUrl server, the download mode information is target download link information corresponding to the target file, where the target download link information is other download link information that is provided by the HashToUrl server and used for downloading the target file. When the second server is the tracker server, the download mode information is the information of a target P2P client containing the target file, where the information of the target P2P client is the information of other P2P client containing the target file and provided by the tracker server. When the second server includes both the tracker server and the HashToUrl server, the download mode information includes target download link information corresponding to the target file and the information of a target P2P client containing the target file.

Therefore, when the second server is the HashToUrl server, and the download mode information is target download link information corresponding to the target file, Step 22 includes specifically that: the P2P client sends the file identifier of the target file to the HashToUrl server; and the HashToUrl server looks up the stored corresponding relationship between the file identifier and the download link, obtains the target download link information corresponding to the target file, and sends the target download link information corresponding to the target file to the P2P client.

When the second server is the tracker server, and the download mode information is the information of a target P2P client containing the target file, Step 22 is specifically that: the P2P client sends the file identifier of the target file to the tracker server; and the tracker server looks up the corresponding relationship between the file and the P2P client, and obtains and sends to the P2P client the information of a target P2P client containing the target file.

When the second server is the combination of a HashToUrl server and a tracker server, the P2P client can obtain both target download link information corresponding to the target file and the information of a target P2P client containing the target file in accordance with the modes aforementioned, respectively.

At Step 23, the P2P client downloads the target file in accordance with the download mode information about the target file.

After the download mode information about the target file is obtained in Step 22, the target file can be downloaded by virtue of the download mode information.

For example, the target file can be downloaded by using the target download link information returned by the HashToUrl server; and when a plurality of download links are included in the target download link information, multi-link download can also be started. For example again, the target file can also be downloaded via the information of the target P2P client returned by the tracker server. When the information of the target P2P client includes the information of a plurality of target P2P clients, one or more target P2P clients may be selected in accordance with a certain algorithm to download the target file. For example, a target P2P client closest to the P2P client downloading the file can be selected for the downloading.

As can be seen from the above, a special storage platform established for storing the copy of the target file and the download link related to the target file in the prior art is not necessary in the second embodiment of the invention. Therefore, the maintenance and investment for some storage platform are not needed for the present embodiment of the invention. Thus, compared with the prior art, the file download method disclosed by the present embodiment of the invention is advantageous for cost saving.

Additionally, because the copy of the target file and the link thereof need not be stored on a certain storage platform, the safety of some files that are more demanding for security can also be ensured by utilizing the method disclosed in the second embodiment of the invention.

In order to further improve the user experience, the third embodiment of the invention is obtained by improvements on the basis of the second embodiment of the invention, so that a new download link can be generated for a broken link and used for file downloading by users.

Figure 3:
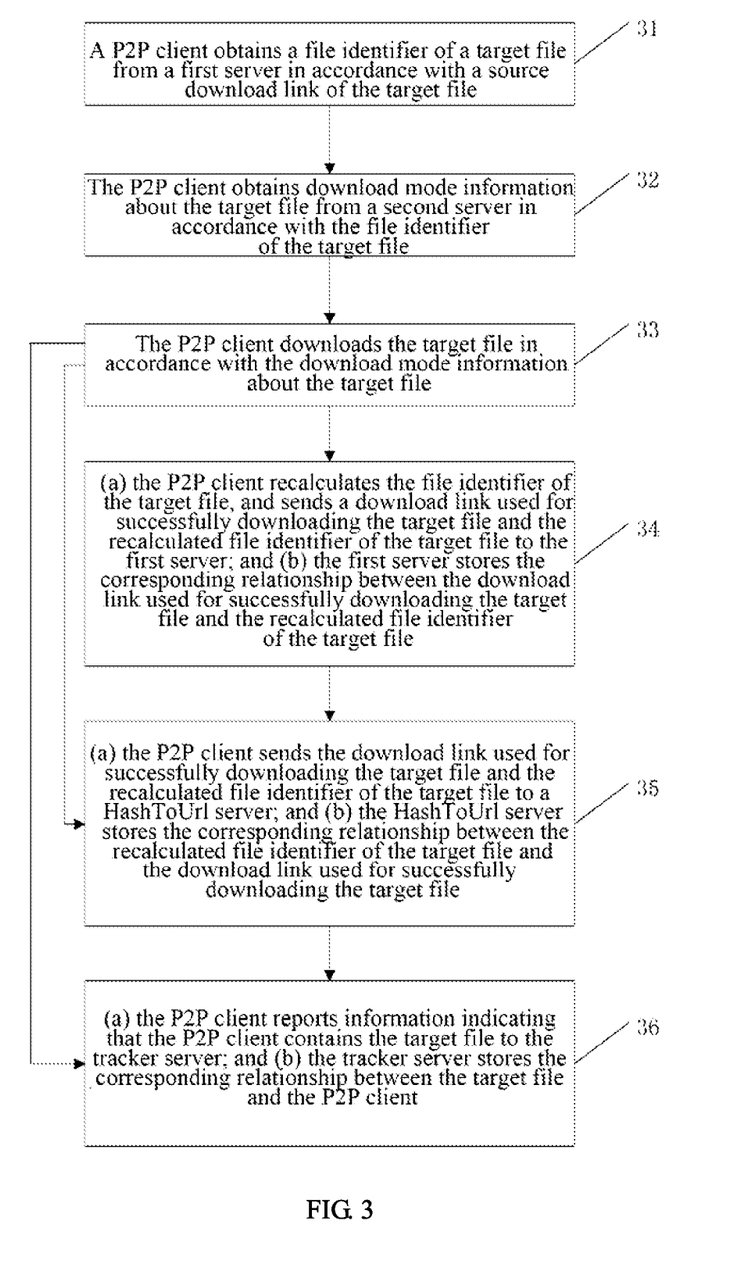
FIG. 3 is a flow chart of the file download method according to a third embodiment of the invention.

As shown in FIG. 3, the file download method disclosed in the third embodiment of the invention includes:

Step 31: a P2P client obtains a file identifier of a target file from a first server in accordance with a source download link of the target file;

Step 32: the P2P client obtains download mode information about the target file from a second server in accordance with the file identifier of the target file; and Step 33: the P2P client downloads the target file in accordance with the download mode information about the target file.

Reference may be made to the descriptions of Steps 21-23 for detailed information of Steps 31-33.

The third embodiment of the invention may further include any combination of the following Steps 34, 35 and 36.

Step 34 includes that: (a) the P2P client recalculates the file identifier of the target file, and sends a download link used for successfully downloading the target file and the recalculated file identifier of the target file to the first server; and (b) the first server stores the corresponding relationship between the download link used for successfully downloading the target file and the recalculated file identifier of the target file.

Here, the download link used for successfully downloading the target file refers to a download link used by the P2P client for successfully downloading the target file.

Step 35 includes that: (a) the P2P client sends the download link used for successfully downloading the target file and the recalculated file identifier of the target file to a HashToUrl server; and (b) the HashToUrl server stores the corresponding relationship between the recalculated file identifier of the target file and the download link used for successfully downloading the target file.

Step 36 includes that: (a) the P2P client reports information indicating that the P2P client contains the target file to the tracker server; and (b) the tracker server stores the corresponding relationship between the target file and the P2P client.

Therefore, the third embodiment of the invention is advantageous for not only saving costs and ensuring the safety of the target file, but also generating a new download link for the broken link so that the new download link may be used by other users for file downloading.

Figure 4:
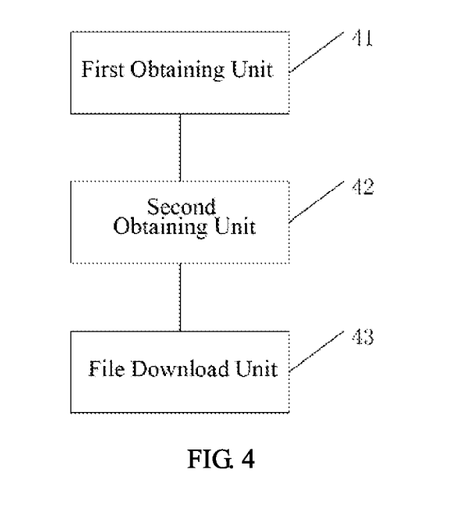
FIG. 4 is a schematic diagram of the file download device according to a fourth embodiment of the invention.

As shown in FIG. 4, the file download device disclosed in the fourth embodiment of the invention includes:

a first obtaining unit 41, which is used for obtaining a file identifier of a target file from a first server in accordance with a source download link of the target file; a second obtaining unit 42, which is used for obtaining download mode information about the target file from a second server in accordance with the file identifier of the target file; and a file download unit 43, which is used for downloading the target file in accordance with the download mode information about the target file.

The first obtaining unit 41 includes: a first sending module, which is used for sending the source download link of the target file to the first server, so that the first server looks up the stored corresponding relationship between the download link and the file identifier in accordance with the source download link of the target file to obtain the file identifier of the target file; and a first receiving module, which is used for receiving the file identifier of the target file from the first server.

As mentioned above, the second server can be a tracker server or a HashToUrl server, or includes both the tracker server and the HashToUrl server. Correspondingly, when the second server is the HashToUrl server, the download mode information is target download link information corresponding to the target file. Therefore, the second obtaining unit 42 may have different in compositions.

Figure 5:
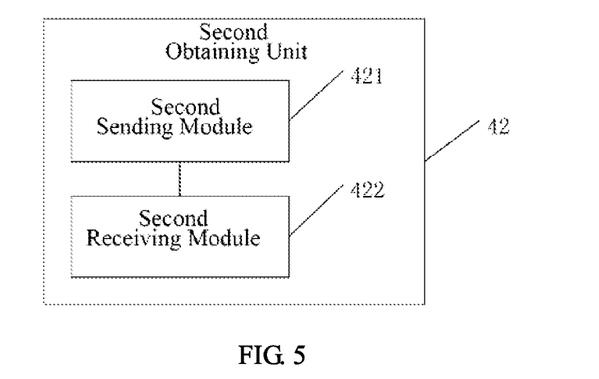
FIGS. 5 to 7 are schematic diagrams of the second obtaining unit in the fourth embodiment of the invention.

Therefore, if the second server is a HashToUrl server and the download mode information is target download link information corresponding to the target file, as shown in FIG. 5, the second obtaining unit 42 includes:

a second sending module 421, which is used for sending the file identifier of the target file to the HashToUrl server, so that the HashToUrl server looks up the stored corresponding relationship between the file identifier and the download link to obtain the target download link information corresponding to the target file; and a second receiving module 422, which is used for receiving the target download link information corresponding to the target file from the HashToUrl server.

Figure 6:
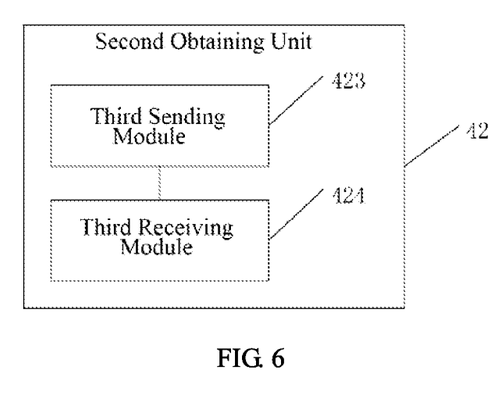

When the second server is a tracker server and the download mode information is the information of a target P2P client containing the target file, as shown in FIG. 6, the second obtaining unit 42 includes:

a third sending module 423, which is used for sending the file identifier of the target file to the tracker server, so that the tracker server looks up corresponding relationship between the file and the P2P client to obtain the information of the target P2P client containing the target file; and a third receiving module 424, which is used for receiving the information of the target P2P client containing the target file from the tracker server.

Figure 7:
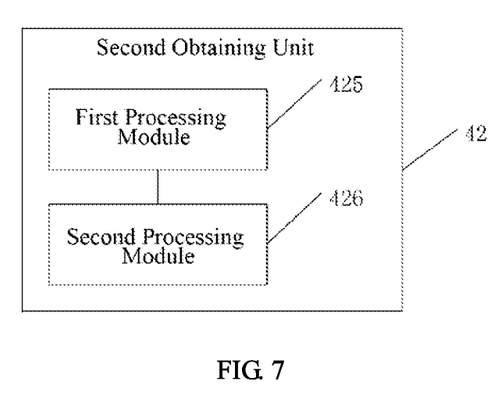

When the second server is the combination of a HashToUrl server and a tracker server, and the download mode information includes target download link information corresponding to the target file and the information of a target P2P client containing the target file, as shown in FIG. 7, the second obtaining unit 42 includes:

a first processing module 425, which is used for sending the file identifier of the target file to the HashToUrl server so that the HashToUrl server looks up the stored corresponding relationship between the file identifier and the download link to obtain target download link information corresponding to the target file, and receiving the target download link information corresponding to the target file from the HashToUrl server; and a second processing module 426, which is used for sending the file identifier of the target file to the tracker server so that the tracker server looks up the corresponding relationship between the file and the P2P client to obtain the information of a target P2P client containing the target file, and receiving the information of the target P2P client containing the target file from the tracker server.

As can be seen from the above, a special storage platform established for storing the copy of the target file and the download link related to the target file in the prior art is not necessary in the fourth embodiment of the invention. Therefore, the maintenance and investment for some storage platform are not needed for the present embodiment of the invention. Thus, compared with the prior art, the file download device disclosed by the present embodiment of the invention is advantageous for cost saving.

Additionally, because the copy of the target file and the link thereof need not be stored on a certain storage platform, the safety of some files that are more demanding for security can also be ensured by utilizing the device disclosed in the fourth embodiment of the invention.

Figure 8:
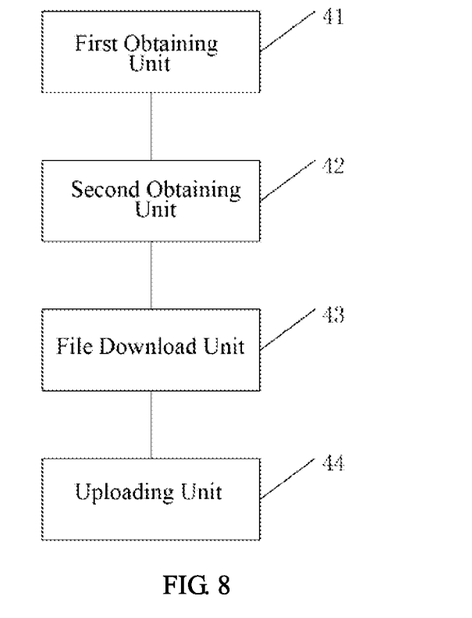
FIG. 8 is a schematic diagram of the file download device according to a fifth embodiment of the invention.

As shown in FIG. 8, the file download device disclosed in the fifth embodiment of the invention further includes an uploading unit 44 in addition to the parts of the device disclosed in the fourth embodiment of the invention, and the uploading unit 44 is used for performing any one or any combination of the following operations.

Herein, the operations include:

recalculating the file identifier of the target file, and sending a download link used for successfully downloading the target file and the recalculated file identifier of the target file to the first server, so that the first server stores the corresponding relationship between the download link used for successfully downloading the target file and the recalculated file identifier of the target file;

sending the download link used for successfully downloading the target file and the recalculated file identifier of the target file to a HashToUrl server, so that the HashToUrl server stores the corresponding relationship between the recalculated file identifier of the target file and the download link used for successfully downloading the target file; and reporting information indicating that the target file is contained in the file download device to the tracker server, so that the tracker server stores the corresponding relationship between the target file and the file download device.

Herein, reference may be made to the description of the corresponding parts in the above fourth embodiment, for the description of the first obtaining unit 41, the second obtaining unit 42 and the file download unit 43 in the fifth embodiment, and the second obtaining unit 42 may also adopt the structure described in the fourth embodiment.

Therefore, in the fifth embodiment of the invention, costs are saved, the safety of the target file is ensured, and a new download link can be generated for a broken link and used by other users for file downloading.

Herein, the device disclosed in the fourth or fifth embodiment may be located in a P2P client.

It shall be appreciated by those skilled in the art that realization for all or a part of procedures in the method disclosed by the embodiments aforementioned can be performed by related hardware instructed by a computer program, which may be stored in a computer readable storage medium. The program, when executed, can perform the procedures of the methods in the above embodiments, for example. The storage medium can be a disk, an optical disk, a Read-Only Memory (ROM), or a Random Access Memory (RAM) and the like.

The above description only shows specific embodiments of the invention, rather than limiting the scope thereof. All the changes or replacements which readily occur to those skilled in the art without departing from the technical scope disclosed in the invention shall fall within the protection scope of the invention. Therefore, the protection scope of the invention is defined by the claims appended.

The Implementation of the Invention

Industrial Practicability

The Free Content of the Sequence Table

The invention claimed is:

1. A file download method, comprising:
obtaining a file identifier of a target file from a first server in accordance with a source download link of the target file;
obtaining download mode information about the target file from a second server in accordance with the file identifier of the target file; and
downloading the target file in accordance with the download mode information about the target file;
wherein, obtaining a file identifier of a target file from a first server in accordance with a source download link of the target file, comprises:
sending the source download link of the target file to the first server, so that the first server looks up the stored corresponding relationship between the download link and the file identifier in accordance with the source download link of the target file to obtain the file identifier of the target file; and
receiving the file identifier of the target file from the first server;
wherein the file identifier is a Hash value of the target file;

wherein the second server is a HashToUrl server, and the download mode information is target download link information corresponding to the target file;
obtaining download mode information about the target file from a second server in accordance with the file identifier of the target file comprises:
sending the file identifier of the target file to the HashToUrl server, so that the HashToUrl server looks up the stored corresponding relationship between the file identifier and the download link to obtain the target download link information corresponding to the target file; and
receiving the target download link information corresponding to the target file from the HashToUrl server.

2. The method of claim 1, wherein
the method further comprises any one or a combination of steps of:
recalculating, by a P2P client, the file identifier of the target file, and sending a download link used for successfully downloading the target file and the recalculated file identifier of the target file to the first server, so that the first server stores a corresponding relationship between the download link used for successfully downloading the target file and the recalculated file identifier of the target file;
sending, by the P2P client, the download link used for successfully downloading the target file and the recalculated file identifier of the target file to the HashToUrl server, so that the HashToUrl server stores a corresponding relationship between the recalculated file identifier of the target file and the download link used for successfully downloading the target file; and
reporting, by the P2P client, information indicating that the target file is contained at the P2P client to the tracker server, so that the tracker server stores a corresponding relationship between the target file and the P2P client.

3. A file download method, comprising:
obtaining a file identifier of a target file from a first server in accordance with a source download link of the target file;
obtaining download mode information about the target file from a second server in accordance with the file identifier of the target file;
and downloading the target file in accordance with the download mode information about the target file;
wherein obtaining a file identifier of a target file from a first server in accordance with a source download link of the target file, comprises:
sending the source download link of the target file to the first server, so that the first server looks up the stored corresponding relationship between the download link and the file identifier in accordance with the source download link of the target file to obtain the file identifier of the target file;
and receiving the file identifier of the target file from the first server;
wherein the second server is a HashToUrl server, and the download mode information is target download link information corresponding to the target file;
obtaining download mode information about the target file from a second server in accordance with the file identifier of the target file comprises:
sending the file identifier of the target file to the HashToUrl server, so that the HashToUrl server looks up the stored corresponding relationship between the file identifier and the download link to obtain the target download link information corresponding to the target file; and
receiving the target download link information corresponding to the target file from the HashToUrl server.

4. The method of claim 3, wherein
the method further comprises any one or a combination of steps of:
recalculating, by the P2P client, the file identifier of the target file, and sending a download link used for successfully downloading the target file and the recalculated file identifier of the target file to the first server, so that the first server stores a corresponding relationship between the download link used for successfully downloading the target file and the recalculated file identifier of the target file;
sending, by the P2P client, the download link used for successfully downloading the target file and the recalculated file identifier of the target file to the HashToUrl server, so that the HashToUrl server stores a corresponding relationship between the recalculated file identifier of the target file and the download link used for successfully downloading the target file; and
reporting, by the P2P client, information indicating that the target file is contained in the P2P client to the tracker server, so that the tracker server stores a corresponding relationship between the target file and the P2P client.

5. A file download device, comprising:
a first obtaining unit, which is used for obtaining a file identifier of a target file from a first server in accordance with a source download link of the target file;
a second obtaining unit, which is used for obtaining download mode information about the target file from a second server in accordance with the file identifier of the target file; and
a file download unit, which is used for downloading the target file in accordance with the download mode information about the target file;
wherein the first obtaining unit comprises:
a first sending module, which is used for sending the source download link of the target file to the first server, so that the first server looks up the stored corresponding relationship between the download link and the file identifier in accordance with the source download link of the target file to obtain the file identifier of the target file; and
a first receiving module, which is used for receiving the file identifier of the target file from the first server;
the second server is a HashToUrl server, and the download mode information is target download link information corresponding to the target file; and the second obtaining unit comprises:
a second sending module, which is used for sending the file identifier of the target file to the HashToUrl server, so that the HashToUrl server looks up the stored corresponding relationship between the file identifier and the download link to obtain the target download link information corresponding to the target file; and
a second receiving module, which is used for receiving the target download link information corresponding to the target file from the HashToUrl server.

6. The device of claim 5, wherein the device further comprises:
an uploading unit, which is used for performing any one or any combination of operations comprising:
recalculating the file identifier of the target file, and sending a download link used for successfully downloading the target file and the recalculated file identifier of the target file to the first server, so that the first server stores a corresponding relationship between the download link used for successfully downloading the target file and the recalculated file identifier of the target file;

sending the download link used for successfully downloading the target file and the recalculated file identifier of the target file to the HashToUrl server, so that the HashToUrl server stores a corresponding relationship between the recalculated file identifier of the target file and the download link used for successfully downloading the target file; and reporting information indicating that the target file is contained in the download device to the tracker server, so that the tracker server stores a corresponding relationship between the target file and the file download device.

7. A file download system, comprising:

a P2P client, which comprises the file download device of any one of claims 5-6, and is used for: sending a source download link of a target file to a first server, and obtaining a file identifier of the target file from the first server; sending the file identifier of the target file to a second server, and obtaining download mode information about the target file from the second server; and downloading the target file in accordance with the download mode information about the target file;

a first server, which is used for providing the file identifier of the target file for the P2P client;

and a second server, which is used for providing the download mode information about the target file for the P2P client;

wherein the second server is a HashToUrl server, and the download mode information is target download link information corresponding to the target file, and the HashToUrl server looks up the stored corresponding relationship between the file identifier and the download link, to obtain the target download link information corresponding to the target file; or the second server is a tracker server, and the download mode information is the information of a target P2P client containing the target file; the tracker server looks up a corresponding relationship between the file and the P2P client, to obtain the information of the target P2P client containing the target file; or the second server is the combination of a HashToUrl server and a tracker server, and the download mode information includes target download link information corresponding to the target file and the information of a target P2P client containing the target file; the HashToUrl server looks up the stored corresponding relationship between the file identifier and the download link, to obtain the target download link information corresponding to the target file; the tracker server looks up a corresponding relationship between the file and the P2P client, to obtain the information of the target P2P client containing the target file.

* * * * *